(12) United States Patent
Patnaik et al.

(10) Patent No.: US 8,255,255 B2
(45) Date of Patent: *Aug. 28, 2012

(54) SYSTEM AND METHODS OF MANAGING ASSIGNMENTS

(75) Inventors: Smaranika Patnaik, Pleasanton, CA (US); Sargent L. Kennedy, Alamo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,000

(22) Filed: May 26, 2011

(65) Prior Publication Data

US 2011/0276357 A1 Nov. 10, 2011

Related U.S. Application Data

(62) Division of application No. 10/903,292, filed on Jul. 30, 2004, now Pat. No. 7,974,865.

(60) Provisional application No. 60/491,393, filed on Jul. 31, 2003.

(51) Int. Cl.
*G06Q 10/00* (2012.01)
(52) U.S. Cl. .................................................... 705/7.13
(58) Field of Classification Search .................. 705/7.12, 705/7.13
See application file for complete search history.

(56) References Cited

U.S. PATENT DOCUMENTS

| | | | |
|---|---|---|---|
| 6,487,283 B2 * | 11/2002 | Thomas et al. | .......... 379/112.01 |
| 6,763,334 B1 | 7/2004 | Matsumoto et al. | |
| 6,848,542 B2 | 2/2005 | Gailey et al. | |
| 6,850,895 B2 | 2/2005 | Brodersen et al. | |
| 7,130,861 B2 | 10/2006 | Bookman et al. | |
| 7,340,410 B1 | 3/2008 | Vaillancourt et al. | |
| 7,340,411 B2 | 3/2008 | Cook | |
| 7,506,053 B1 * | 3/2009 | Qin | ............................... 709/225 |
| 7,546,243 B2 | 6/2009 | Kapadia et al. | |
| 2001/0001000 A1 * | 5/2001 | Thomas et al. | ............... 370/200 |
| 2004/0143484 A1 | 7/2004 | Kapadia et al. | |

OTHER PUBLICATIONS

Yahoo Groups. Tree Manager question Nov. 15, 2000.*
PeopleSoft. PeopleTools 7.12 Tree Manager Peoplebook. Jan. 2001.*
Bartholomew, Doug, "A better way to work," InformationWeek, n544, p. 32(6), Sep. 11, 1995, ISSN:0735-4343.
"Streamlining Sales, Trends promise better sales, marketing coordination; but non-tech issues remain," BtoB, v88, n4, p. 17, Apr. 14, 2003.
"NetLedger Launches NetCRM™, First Online CRM Application to Automate Entire Sales Process—From Lead Generation to Prospect Management to Sales Order," PR Newswire, SFTU04910092002, Sep. 10, 2002.

* cited by examiner

*Primary Examiner* — Johnna Loftis (74) *Attorney, Agent, or Firm* — Kilpatrick Townsend & Stockton LLP (57) ABSTRACT

Disclosed are systems and methods of making assignments, particularly of sales leads. The assignments are considered either committed or uncommitted responsive to an effective date associated with one or more assignment rule used to make the assignments. Uncommitted assignments may be used to review the effects of changes in assignment rules. Examples are provided including the use of uncommitted assignments to review the effects of changes in a hierarchical territory structure.

12 Claims, 6 Drawing Sheets

Tree Reorganization

▽ STEP 1: Select Current Tree

Description: Reorganize Sales Territories    Status: InProgress

Current Tree Name: WORLD ▽    Current Effective Date: 04/29/2003 — 310

▽ STEP 2: Select New Tree/Date

Select a tree and the date it will become active — 312

New Tree Name: WORLD 🔍    New Effective Date: 12/01/2003 📅 — 314

Clone/Update Tree

Territory Definitions

| Territory | | | |
|---|---|---|---|
| Territory PACIFIC.US200 | | Tree Name WORLD | |
| Description Pacific US200 - Appliances | | Business Unit US200 | |
| Assignment Group CRM01 - SALES | | Market Global | |

Territory Definition  Find | View All  First ◁ 1 of 2 ▷ Last   [+] [−]   — 316

Assignment Criteria

Effective Date 12/01/2003 [📅]

Criteria Code Estimated Revenue   Customize | Find | 📊 | 🔲  First ◁ 1 of 1 ▷ Last  [+] [−]

| ▽ Criteria | To Criteria Value |
|---|---|
| From Criteria Value | 8000000 |
| 4000000 | |

▽ Sales Users   Customize | Find | 📊 | 🔲  First ◁ 1 of 1 ▷ Last  [+] [−]

| Sales User | | Sales Rep | Primary | Assigned TimeStamp |
|---|---|---|---|---|
| Rabbitt, Sam Pacific | 🔍 | ☑ | ☑ | 06/11/2002 12:00:00:000000AM |

Reorganize Territory Tree | Lead Reorganization | Opportunity Reorganization | Submit Reorganization Lead Reorganization Enter New Territory and New Rep on Leads to be reorganized.

▽ Edit Reorganization — 334

Lead Info | More Details

Customize | Find | View All | ▦ First ◁ 5-9 of 3 ▷ Last

| Select | Lead | Current Territory | Current Rep | Current Team | New Rep | New Territory | New Team |
|---|---|---|---|---|---|---|---|
| ☑ | Cady Dishwasher Lead | Pacific US200 Appliances | Rabbitt, Sam Pacific | Current Team | ▢ 🔍 | ▢ 🔍 | New Team |
| ☑ | TESTREORG2 | USA CRM01 - Appliance | Marx, Stu Manager | Current Team | Rabbitt, Sam Pacific 🔍 | Pacific US200 - Appli 🔍 | New Team |
| ☑ | Kelly Test | USA CRM01 - Appliance | Marx, Stu Manager | Current Team | Redford,Sabrina Allan/ 🔍 | Atlantic US200 - Ap 🔍 | New Team |
| ☑ | 2 Million Deal | USA CRM01 - Appliance | Marx, Stu Manager | Current Team | Ralphs, Sandy Mounta 🔍 | Mountain US200 - Ap 🔍 | New Team |
| ☑ | 6 Million Deal | USA CRM01 - Appliance | Marx, Stu Manager | Current Team | Rabbitt, Sam Pacific 🔍 | Pacific US200 - Appli 🔍 | New Team |

☑ Select All   ☐ Clear All

Go To: Opportunity Reorganization Worksheet

[Save]   [Return to Search]   [Next In List]   [Previous In List]   [Add]

FIG. 3D

SYSTEM AND METHODS OF MANAGING ASSIGNMENTS

CROSS-REFERENCES TO RELATED APPLICATIONS

This application is a divisional of U.S. patent application Ser. No. 10/903,292, filed Jul. 30, 2004, which claims the benefit of U.S. Provisional Application No. 60/491,393, filed Jul. 31, 2003. The above applications are hereby incorporated by reference in their entireties for all purposes.

BACKGROUND

1. Field of the Invention

The invention is in the field of computing based systems for sales management and more specifically for managing of sales leads.

2. Related Art

Sales support systems are an important part of many modern businesses. These systems may be configured to assist in many parts of the sales process. For example, sales support systems are available for generating sales leads, managing accounts, tracking contacts, and managing sales leads. Those support systems configured for managing sales leads sometimes include tools for assigning new leads to sales personnel.

Some prior art systems allow a sales manager to assign a sales lead to a particular salesperson based on a characteristic of the sales lead and a predefined assignment rule. The sales lead may be information about, a potential customer such as their contact information, purchasing potential, or interests. In a typical instance a predefined assignment rule may specify that all sales leads associated with potential customers in a certain territory be assigned to a specific salesperson.

In operation, sales lead assignment tools are typically configured to receive new sales leads and make assignments based on a single static set of assignment rules. Once an assignment rule is changed, any further assignments immediately reflect the change. Using these systems it is difficult to make substantive changes to sets of assignment rules because all the changes must be completed before any further assignments are made. Otherwise, one or more assignment may be made under a mixed set of rules leading to unpredictable and undesirable results. It is not unusual for administrators of a previously known sales assignment tool to work over a weekend in order to complete a modification of the assignment tool in hopes of completing their work before the tool is again used for making sales lead assignments on a Monday morning.

This prior approach may generate related problems. For example, the assignments made on the Monday morning may include surprises for both the administrators and sales personnel. The distribution of sales leads may be unbalanced, mistakes in assignment rules are only discovered after assignments are made, and sales personnel may be unsatisfied with new assignments, etcetera These and other disadvantages of the prior art are overcome by the invention.

BRIEF SUMMARY

Embodiments of invention are directed toward management of sales lead assignments using assignment rules associated with an effective date. Assignments made before the effective date are considered uncommitted and are tentative. Assignments made on or after the effective date are considered committed and may be further acted on by assignees. Uncommitted assignments may be used to review (preview) the affects of changes in assignment rules, to make manual adjustments to assignments before they become committed, to load balance the distribution of assignments among assignees, or the like. Different assignment rules may be associated with different effective dates.

Various embodiments of the invention include a sales lead management system comprising one or more interfaces configured to define assignment rules, to assign sales leads, and to review present sales lead assignments and future sales lead assignments, the present sales lead assignments being made using first assignment rules having a first effective date, the future sales lead assignments being uncommitted and being made using second assignment rules having a second effective date different from the first effective date, rules memory configured to store at least the first assignment rules and the second assignment rules, committed assignment memory configured for storing the present sales lead assignments, uncommitted assignment memory configured for storing the future sales lead assignments, computing instructions configured for using the first assignment rules to generate the present sales lead assignments, and for using the second assignment rules to generated the future sales lead assignments, the computing instructions being responsive to data characterizing one or more sales leads to be assigned, and a processor configured to execute the computing instructions.

Various embodiments of the invention include a method of managing assignment of a sales lead, the method comprising defining a characteristic of an assignment rule, assigning a first sales lead using the assignment rule to make a first assignment, the first assignment being committed, reviewing the first assignment, modifying the characteristic of the assignment rule, specifying an effective date for the modified assignment rule, the effective date being a date in the future, and assigning a second sales lead using the modified assignment rule to make a second assignment, the second assignment being uncommitted because the effective date is in the future.

Various embodiments of the invention include a method of managing assignment of a sales lead, the method comprising selecting a territory tree, selecting a new effective date for the territory tree, modifying the territory tree, and assigning sales leads responsive to the modified territory tree, the assignments being uncommitted until the effective date.

Various embodiments of the invention include a computer readable media including computer code comprising, a code segment configured for defining a characteristic of an assignment rule, a code segment configured for assigning a first sales lead using the assignment rule to make a first assignment, the first assignment being committed, a code segment configured for reviewing the first assignment, a code segment configured for modifying the characteristic of the assignment rule, a code segment configured for specifying that an assignment made with the modified assignment rule will be uncommitted, the effective date being a date in the future, and a code segment configured for assigning a second sales lead using the modified assignment rule to make a second assignment, the second assignment being uncommitted because the effective date is in the future.

Various embodiments of the invention include a system for managing sales lead assignments the system comprising means for defining a characteristic of an assignment rule, means for assigning a first sales lead using the assignment rule to make a first assignment, the first assignment being committed, means for reviewing the first assignment, means for modifying the characteristic of the assignment rule, means for specifying that an assignment made using the modified assignment rule will be uncommitted, and means for assigning a second sales lead using the modified assignment rule to make a second assignment, the second assignment being uncommitted.

Various embodiments of the invention include an assignment system having three sets of assignment rules. A first set applicable to a first territory, a second set applicable to a second territory and a third set applicable to both the first territory and the second territory, other elements being optional. In these embodiments, assignment criteria are optionally associated with one or multiple territories, or one or multiple business units.

Various embodiments of the invention includes an assignment system configured to assign a sales lead to a matrix of assignees based on a set of assignment rules, the matrix of assignees including business entities having different territories, other aspects being optional. In these embodiments, the assignment is optionally automatically made to multiple assignees and optionally manually restricted to one assignee. In these embodiments the multiple assignees are considered and optionally one of those considered is automatically selected for assignment. In these embodiments, an assignment of a sales lead is optionally made to a single team or multiple teams. In these embodiments, the territories are optionally overlapping. In these embodiments, the security privileges of the assignees may differ.

Various embodiments of the invention include an assignment system configured for assigning a sales lead using different criteria at different stages of development of the sales lead, other aspects being optional. In these embodiments, the different stages of development of the sales lead are optionally associated with different data components. In these embodiments, assignment criteria are optionally associated with a data field that appears in more than one data component of the assignment system.

These and other aspects of the invention are disclosed further herein.

DETAILED DESCRIPTION

Embodiments of the invention include a sales lead management system in which sales lead assignments may be classified as committed or uncommitted. Committed assignments are typically final and ready to be acted upon by an assignee (e.g. salesperson or group of sales personnel). Uncommitted assignments may be temporary and enable a variety of processes not possible in the prior art. For example, on receiving a committed assignment a member of a sales team may act to accomplish the next step in a sales process. In contrast, uncommitted assignments allow examination (e.g., previewing) of the affects of making a change in assignment rules. As discussed further herein, committed and uncommitted assignments are used to overcome various disadvantages of the prior art.

The making of committed and uncommitted assignments is facilitated by assignment rules that are associated with an effective date. Assignments made prior to the effective date of an assignment rule are considered uncommitted while assignments made on or after the effective date are considered committed. In some embodiments, an uncommitted assignment may become committed on arrival of the effective date. The effective date associated with an assignment rule may be specified by an administrator or other party authorized to define or modify the assignment rule.

Typically, assignments of sales leads are made using a set of assignment rules, each assignment rule included in the set optionally being responsive to different assignment criteria. For example, one assignment rule may be responsive to a geographic criteria such as a sales territory, while another assignment rule may be responsive to a monetary value associated with the sales lead. In some embodiments, the effective date associated with a set of assignment-rules is the latest effective date associated with, any of the assignment rules included in the set. Thus, an assignment may become committed on the date of the last effective date associated with any of the set of assignment rules used to make the assignment.

Uncommitted assignments may be made without making or modifying committed assignments. Thus, systems and methods of the invention may include states having both committed and uncommitted assignments at the same time. The committed assignments having been made with a first set of assignment rules whose effective date has been reached, and the uncommitted assignments having been made with a second set of assignment rules whose effective date is in the future. In these states, the committed assignments may be used by assignees to further the sales process, while uncommitted assignments may be used to test, modify, preview, or otherwise develop assignment rules and their resulting assignments without disturbing the sales process.

Figure 1:
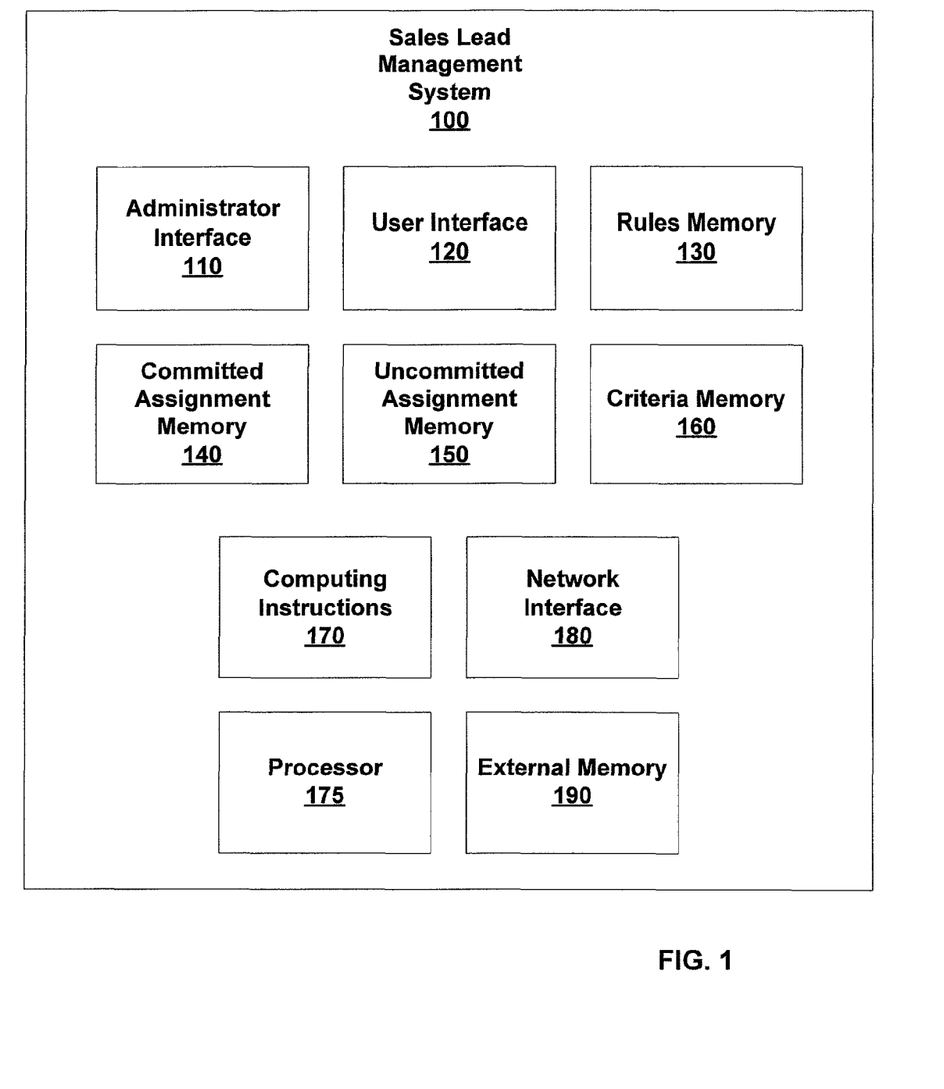
FIG. 1 is a block diagram illustrating a sales lead management system, according to various embodiments of the invention.

FIG. 1 is a block diagram illustrating a Sales Lead Management System 100, according to various embodiments of the invention. Sales Lead Management System 100 includes an Administrator Interface 110, a User Interface 120, Rules Memory 130, Committed Assignment Memory 140, Uncommitted Assignment Memory 150, Criteria Memory 160, Computing Instructions 170, a Processor 175, a Network Interface 180, and/or External Memory 190. As described further herein, Sales Lead Management System 100 may be a unitary or distributed system including one or more computing devices configured to communicate over a computer network such as the Internet, a local area network, or the like. In some embodiments, Rules Memory 130, Committed Assignment Memory 140, Uncommitted Assignment Memory 150, and Criteria Memory 160 are embodied in the same memory hardware (e.g., RAM, ROM, a cache, hard drive, optical drive, etc.), while in other embodiments these aspects of the invention are distributed among more than one memory device.

Administrator Interface 110 is configured for an administrator to define assignment rules, associate effective dates with assignment rules, review committed and uncommitted assignments, or the like. The administrator is typically a party having authority to perform these tasks. For example, in some embodiments, the administrator is a senior sales manager or manager of Sales Lead Management system 100. In some embodiments, Administrator Interface 110 includes HTML, XML, script, computer code, or the like for generating a graphical user interface to be presented to the administrator. For example, in some embodiments, Administrator Interface 110 includes an HTML page configured for delivery to the administrator over the Internet. Further details and examples of Administrator Interface 110 are described in relation to FIGS. 3A-3D.

Optional User Interface 120 is configured for a user to assign a sales lead using assignment rules defined or modified using Administrator Interface 110. The user may be an administrator, a sales manager or other party authorized to assign sales leads. In some embodiments, User Interface 120 includes HTML, XML, script, computer code, or the like for generating a graphical user interface to be presented to the user. For example, in some embodiments, User Interface 120 includes an HTML page configured for delivery to the user over the Internet.

In some embodiments, User Interface 120 is configured for a user to review uncommitted assignments and/or compare uncommitted and committed assignments. For example, in some embodiments, User Interface 120 is configured to review the consequences of new assignment rules having an effective date in the future. Using User Interface 120 it is possible, to review uncommitted assignments without modifying or generating committed assignments.

User Interface 120 is optional in embodiments wherein Administrator Interface 110 is configured to perform functions of User Interface 120 or assignments are made automatically. Further details and examples of Administrator Interface 110 are described in relation to FIGS. 3C-3D.

Rules Memory 130 includes memory configured to store one or more assignment rules associated with an effective date, such as those generated or modified using Administrator Interface 110. In addition to a date, the assignment rules may be responsive to characteristics of a sales lead, characteristics of an assignee, and/or other criteria specified using Administrator Interface 110. For example, in one embodiment a set of assignment rules stored in Rules Memory 130 is responsive to a geographic location associated with the sales lead, a value of the sales lead, a sales territory of an assignee, experience of the assignee, and a round robin sales lead distribution scheme defined or specified by an administrator. Assignment rules may be configured for assigning sales leads to an individual assignee or a matrix of assignees (e.g. more than one sales teams and/or individuals). Assignment rules and/or the criteria to which these rules are responsive may be weighted. For example, the experience of an assignee may be weighted higher when the potential value of a sale is higher, relative to than when the potential value is lower.

The effective date or dates associated with assignment rules stored in Rules Memory 130 are typically calendar dates that are also stored in Rules Memory 130. However, in some embodiments, an administrator may specify an effective date that will never be reached. Sales lead assignments made using such a rule will never become committed, unless a new effective date is later specified. In these embodiments, a flag may be used to indicate that the effective date associated with an assignment rule, or that uncommitted assignments will never be reached, and a calendar date need not be used to specify the effective date. Similarly, a flag may be used to indicate that the effective date associated with an assignment rule is always in the past.

Typically, making a change in an effective date will not affect the status of assignments previously made using an assignment rule. However, in some embodiments, making a change in an effective date associated with a rule may result in a change in the status of any assignments previously made with that assignment rule. For example, if the original effective date was in the future then the assignments would have had an uncommitted status. If the effective date is changed to the present or the past, then the status of these assignments may automatically be changed to being committed.

Not all assignment rules in a set of assignment rules need be associated with effective dates. For example, a rule defined using Administrator Interface 110 and not associated with an effective date will immediately become effective. Only one assignment rule in a set of assignment rules stored in Rules Memory 130 need have an effective date in the future, for assignments made using that set of assignment rules to be uncommitted.

Committed Assignment Memory 140 is configured to store assignments that are committed and, thus, not normally revoked. For example, an assignee that receives a committed assignment of a sales lead, can typically assume that sales lead is theirs to pursue and develop into a sale or otherwise advance through the sales process. In some embodiments, a notice of a committed assignment is automatically sent to the assignee while assignees are not notified of uncommitted assignments.

Uncommitted Assignment Memory 150 is configured to store assignments that are uncommitted and, thus, may be revoked or never become committed. For example, an assignee that receives an uncommitted assignment of a sales lead, cannot typically assume that sales lead is theirs to pursue and develop into a sale or otherwise advance through the sales process. In some embodiments, assignees can review (e.g., preview) committed and uncommitted assignments stored in Committed Assignment Memory 140 and Uncommitted Assignment Memory 150, respectively. In some embodiments, this review feature is used to allow assignees to assess the effects of changes in assignment rules stored in Rules Memory 130.

Committed and uncommitted assignments stored in Committed Assignment Memory 140 and Uncommitted Assignment Memory 150 may result from the automatic application of different sets of assignment rules stored in Rules Memory 130 to newly received sales leads. For example, in some embodiments, once a set of assignment rules is complete and stored in Rules Memory 130, newly received sales leads are automatically processed using the set to produce committed and/or uncommitted assignments. Alternatively, these assignments stored in Committed Assignment Memory 140 and Uncommitted Assignment Memory 150 may result from manual assignment of a sales lead by a user through User Interface 120. In some embodiments, uncommitted assignments stored in Uncommitted Assignment Memory 150 are generated using sales leads received in the past (i.e., before the applied set of assignment rules was complete). For example, uncommitted assignments of previously received sales leads may be made in order to observe the effects of changes in assignment rules and/or compare the uncommitted assignments to previously made committed or uncommitted assignments.

A particular sales lead normally is included in only one committed assignment, although this assignment may be to more than one assignee. For example, a committed assignment may be to a sales team located in San Francisco for the purposes of following up with a contact person, and to a vice president of sales in Denver for the purposes of approving a potentially large transaction. However, a particular sales lead may be included in one or more uncommitted assignments in addition to a committed assignment. In some embodiments, an uncommitted assignment of a sales lead will not become committed on the associated effective date if the sales lead is already included in a committed assignment.

Optional Criteria Memory 160 is configured to store criteria to which assignment rules, stored in Rules Memory 130 are responsive. These criteria may include characteristics of a sales lead such as the geographic location of a contact person, the type of organization (corporation, government, individual, etc.), value of potential sale, customer history, or the like. These criteria may also include characteristics of the assignee such as whether the assignee is an individual or matrix of assignees, their security level and authority, territory, experience, performance history, or the like. A matrix of assignees may include a plurality of individuals, a team, or a combination of teams and/or individuals. For example, a matrix of assignees may include a sales person designated to solicit a contact, a publicity center configured to send follow-up material, a sales engineer, and a regional manager with the authority to approve sales. The criteria stored in Criteria Memory 160 may also include characteristics of past sales lead assignments and assignment rules may be responsive to these past assignments. For example, in some embodiments assignment rules are configured to balance the distribution of assignments among assignees (e.g., load balance) and thus an assignment rule may be responsive to a number of assignments already made to a particular assignee. In some embodiments, assignment rules are configured to make assignments using a round robin approach.

Administrator Interface 110 is typically configured to specify the criteria to which assignment rules are responsive, including criteria stored in Criteria Memory 160. However, not all criteria, to which the assignment rules are responsive, need be stored in Criteria Memory 160. In some embodiments, these criteria may be stored in External Memory 190 which is optionally external memory not included in Sales Lead Management System 100. Administrator Interface 110 may, thus, be configured to link external data, or even external logic, to assignment rules.

Criteria Memory 160 is optional when assignment criteria are stored in External memory 190 and/or externally to Sales Lead Management System 100, and accessed at the time an assignment is made. For example, in some embodiments assignment criteria are stored in external memory and accessed over a computer network using Network Interface 180.

Computing Instructions 170 are configured to support Administrator Interface 110 and User Interface 130, to access Rules Memory 130 Committed Assignment Memory 140, Uncommitted Memory 150 and Criteria Memory 160, and to perform assignments of sales leads based on assignment rules stored in Rules Memory 130. In some embodiments Computing Instructions 170 are configured to perform the methods described herein. In some embodiments, Computing Instructions 170 are distributed among a plurality of computing devices.

Processor 175 is configured to execute computing instructions 170. Some embodiments include a plurality of Processor 175, which may be distributed.

Optional Network interface 180 is configured for communication between components of Sales Lead Management System 100 and/or between Sales Lead Management System 100 and external systems. Network Interface 180 is optionally configured for communication of assignment rules, committed assignments, uncommitted assignments, and/or assignment criteria.

External Memory 190 is optional, and further may be either included in Sales Lead Management System 100 or be external to Sales Lead Management System 100. External Memory 190 is configured to store criteria to which assignment rules are responsive and/or logic related to assignment rules. For example, in some embodiments, External Memory 190 is configured to store performance data of a particular assignee, or include a query to a remote database.

Figure 2:
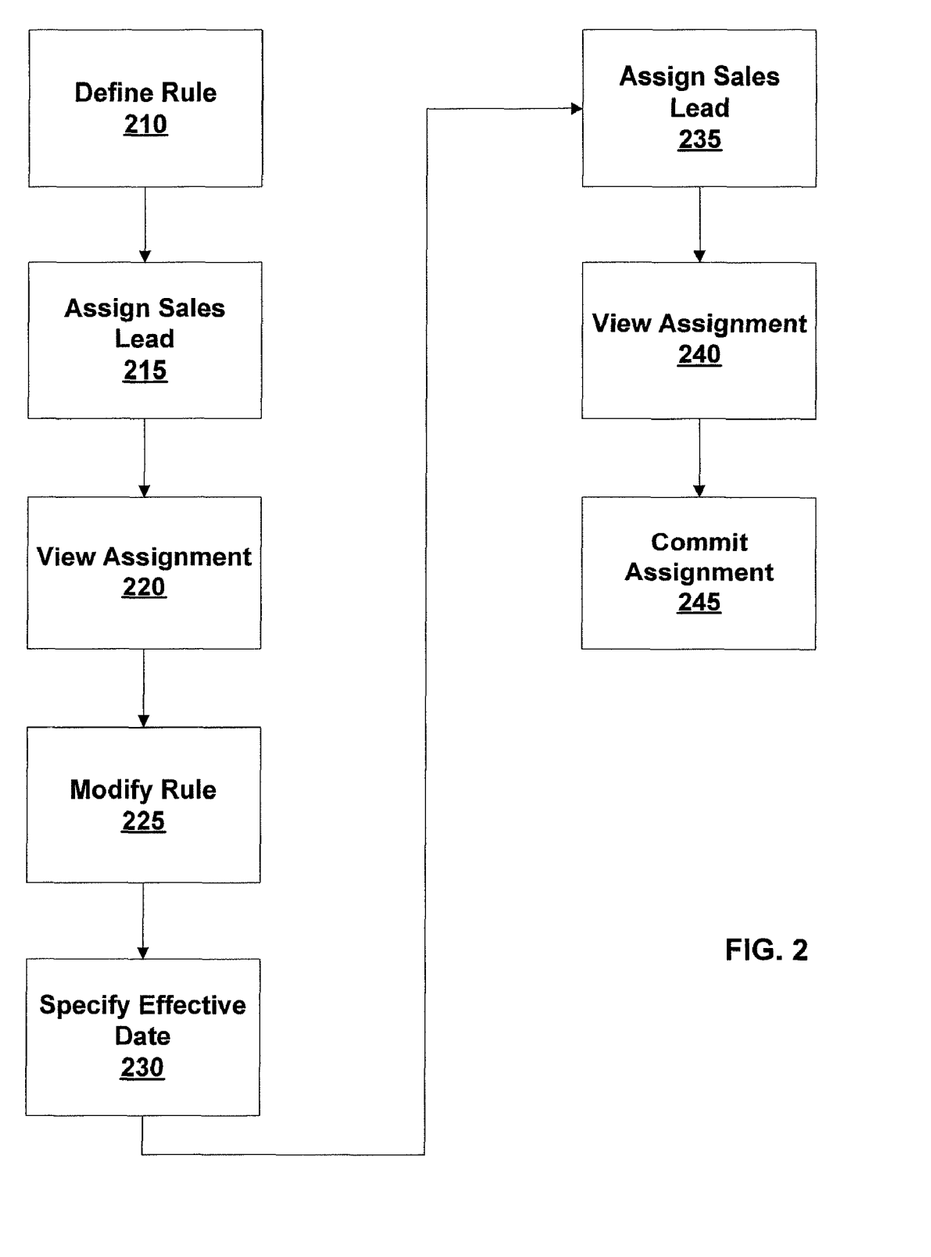
FIG. 2 is a flow chart illustrating methods of managing assignment of one or more sales leads, according to various embodiments of the invention.

FIG. 2 is a flow chart illustrating methods of managing assignment of one or more sales leads, according to various embodiments of the invention. In these illustrative methods two sales lead assignments are made. The first assignment being made using an assignment rule defined using Administrator Interface 110 and the second assignment being made using a modified version of the defined assignment rule. At least the modified version of the assignment rule is associated with an effective date such that the second sales lead assignment is initially uncommitted. In a final step the uncommitted assignment is optionally committed. As described further herein, several of the steps included in FIG. 2 are optional.

In a Define Rule Step 210, an assignment rule is defined using Administrator Interface 110 and typically stored in Rules Memory 130. The defined rule is optionally a member of a first set of assignment rules configured to assign one or more sales leads to one or more assignee. For example, some embodiments include a variety of different assignment criteria and assignees. In these embodiments, a plurality of assignment rules may be required to assign sales leads and Define Rule Step 210 may be performed multiple times in order to define this plurality of assignment rules.

The assignment rule defined in Define Rule Step 210 may or may not be associated with an effective date. In some embodiments, lack of an associated effective date is interpreted as if the assignment rule was associated with an effective date that is always in the past (e.g. Jan. 1, 1900). In some embodiments, an effective date that is always in the past is indicated using a flag associated with the assignment rule. If the rule defined in Define Rule Step 210 is associated with an effective date, that date may be in the future or in the past, relative to a date Define Rule Step 210 is executed.

The assignment rule defined in Define Rule Step 210 may be responsive to one or more criteria associated with assignees, sales leads, Sales Lead Management System 100, assignment history, and/or other criteria defined or specified by an administrator. For example, an assignment rule may be responsive to a sales territory of an assignee, potential value of a sale, a characteristic of a product or service product related to the sales lead, data stored in External Memory 190, external logic, the identity of an account originator, the identity of a lead originator, multiple stages in a sales process, criteria specified by a user using User Interface 120, or the like.

In some embodiments, the assignment rule defined in Define Rule Step 210 is responsive to external logic accessed through a call to external computing instructions. This external logic optionally is defined by a sales team or other organization. For example, in one embodiment an assignment rule is configured to identify a particular sales team for assignment of a sales lead and members of that sales team define their own external logic to determine which individual member should receive a particular assignment.

In some embodiments, the assignment rule defined in Define Rule Step 210 is configured for making assignments responsive to different stages of a sales process. For example, in one embodiment an assignment rule is configured for assigning a first salesperson to perform initial follow-up activities and for assigning a second sales person to negotiate details of a sale once the first sales person completes their assigned tasks. Each of these different stages may be considered a different component of the sales process.

In some embodiments, the assignment rule defined in Define Rule Step 210 is responsive to a hierarchical structure of sales territories. For example, in some instances Define Rule Step 210 is used to define different assignment rules configured to assign sales leads responsive to a first sales territory, a second sales territory and a sales third territory. The second and third sales territories being subsets of the first sales territory. In one embodiment the defined assignment rules may be divided in to three sets, a first set associated with the sales first territory, a second set associated with the second sales territory and a third set associated with both the first sales territory and the second sales territory.

In some embodiments, the assignment rule defined in Define Rule Step 210 is configured to be responsive to criteria defined by an administrator, and User Interface 120 is configured for a user to specify values of this criteria. For example, in some embodiments the defined assignment rule is configured to be responsive to a flag indicating if an assignment should be made to an individual sales person or a matrix of assignees. A user may then set this flag using User Interface 120 at the time a sales lead is assigned.

In some embodiments, the assignment rule defined in Define Rule Step 210 is configured to assign one or more aspects (e.g., components) of the sales process. For example, the assignment rule may be configured to assign different duties, to assign authority, to assign commission, to assign responsibility, or the like, to different assignees. These aspects of the sales process are optionally assigned to different assignees.

In an Assign Sales Lead Step 215, a sales lead is assigned using one or more assignment rules defined using Define Rule Step 210 and Computing Instructions 170. This assignment may be committed or uncommitted responsive to any effective dates associated with the one or more assignment rules. In some embodiments, Assign Sale Lead Step 215 is initiated by a user through User Interface 120. In other embodiments Assign Sale Lead Step 215 is performed automatically upon receipt of a sales lead. The assignment is stored in Committed Assignment Memory 140 or Uncommitted Assignment Memory 150.

In a View Assignment Step 220, the assignment made in Assign Sales Lead Step 215 is viewed by a user, an administrator and/or an assignee. For example, in some embodiments a user may use User Interface 120 to review the assignment over a computer network.

In a Modify Rule Step 225, the assignment rule defined in Define Rule Step 210, or a copy thereof, is modified using Administrator Interface 110. The modified assignment rule and the original assignment rule may be considered part of separate sets of assignment rules, both stored in Rules Memory 130. For example, in one instance Rules Memory 130 includes two sets of assignment rules. A first set including the original assignment rule defined in Define Rule step 210, and a second set including the assignment rule modified in Modify Rule Step 225. The first set and the second set may have some assignment rules in common.

In a Specify Effective Date Step 230, an effective date is associated the assignment rule modified in Modify Rule Step 225. This effective date is optionally in the future. As long as the effective, date is in the future, any assignments made with the modified assignment rule will be uncommitted. For example, if the effective date is at the beginning of the next financial quarter then assignments made using the modified assignment rule will be uncommitted until the next financial quarter starts and then may become committed. If the effective date is set to a date in the distant future, e.g. Jan. 1, 2100, then for practical purposes any assignments made using the modified assignment rule will remain uncommitted unless, in some embodiments, the effective date is changed.

In an Assign Sales Lead Step 235, a sales lead is assigned using the assignment rule modified in Modify Rule Step 225. Assuming the effective date specified in Specify Effective Date Step 230 is still in the future, then the assignment is stored in Uncommitted Assignment Memory 150. However, if the effective date specified in Specify Effective Date Step 230 is not in the past, then the assignment is typically stored in Committed Assignment Memory 140. The assignments made in Assign Sales Lead Step 215 and Assign Sales Lead Step 235 may be considered two sets of assignments, one made using the first set or assignment rules and one made using the second set of assignment rules. The two sets of assignments may have different effective dates.

In a View Assignment Step 240, the assignment made in Assign Sales Lead Step 235 is reviewed by a user, an administrator and/or an assignee. For example, in some embodiments a user may use User Interface 120 to review the assignment over a computer network. In some embodiments, View Assignment Step 240 includes viewing both the assignment made in Assign Sales Lead Step 215 and the assignment made in Assign Sales Lead Step 235. For example, in one embodiment of User Interface 120 the assignments are shown side-by-side in a configuration that allows for easy comparison. This configuration may facilitate previewing the consequences of the change in assignment rules made in Modify Rule Step 225.

In various embodiments, the sales leads assigned in Assign Sales Lead Step 215 and Assign Sales Lead Step 235 may have been received significantly prior to the time of their assignment or may have been received shortly before being assigned. For example, in some instances it is desirable to make uncommitted assignments of sales leads received in the past for comparative purposes. Also, in some instances it is desirable for sales leads to be assigned automatically at the time of receipt. Thus, a sales lead is optionally automatically assigned on receipt using more that one set of assignment rules to produce both committed and/or uncommitted assignments.

In an optional Commit Assignment Step 245 an uncommitted assignment made in Assign Sales Lead Step 235 is committed. This can occur automatically when the effective date is reached or, in some embodiments, if the effective date is changed resulting in a change in assignment status.

Several of the steps illustrated in FIG. 2 are optional. For example, some embodiments of the invention include only Specify Effective Date Step 225, Assign Sales Lead Step 235, and View Assignment 240. In these embodiments, the specified effective date is associated with a previously defined, and optionally otherwise unmodified, assignment rule. And, only the uncommitted assignment is viewed in View Assignment Step 240. Other steps are, therefore, each optional and may be selectively included in alternative embodiments of the invention.

FIGS. 3A-3D are illustrations of Administrative Interface 110 and/or User Interface 120 configured for performing some embodiments of the methods illustrated in FIG. 2. In these embodiments an administrator reorganizes a hierarchical tree based system of sales territories (e.g., modifies assignment rules responsive to geographic location) and specifies an effective date for the reorganization (e.g., an effective date for the modified assignment rules). Uncommitted assignments are made using the new sales territories, and these assignments are reviewed prior to becoming committed. For the purposes of illustration it is assumed that the method illustrated is performed on Jul. 31, 2003.

Figure 3A:
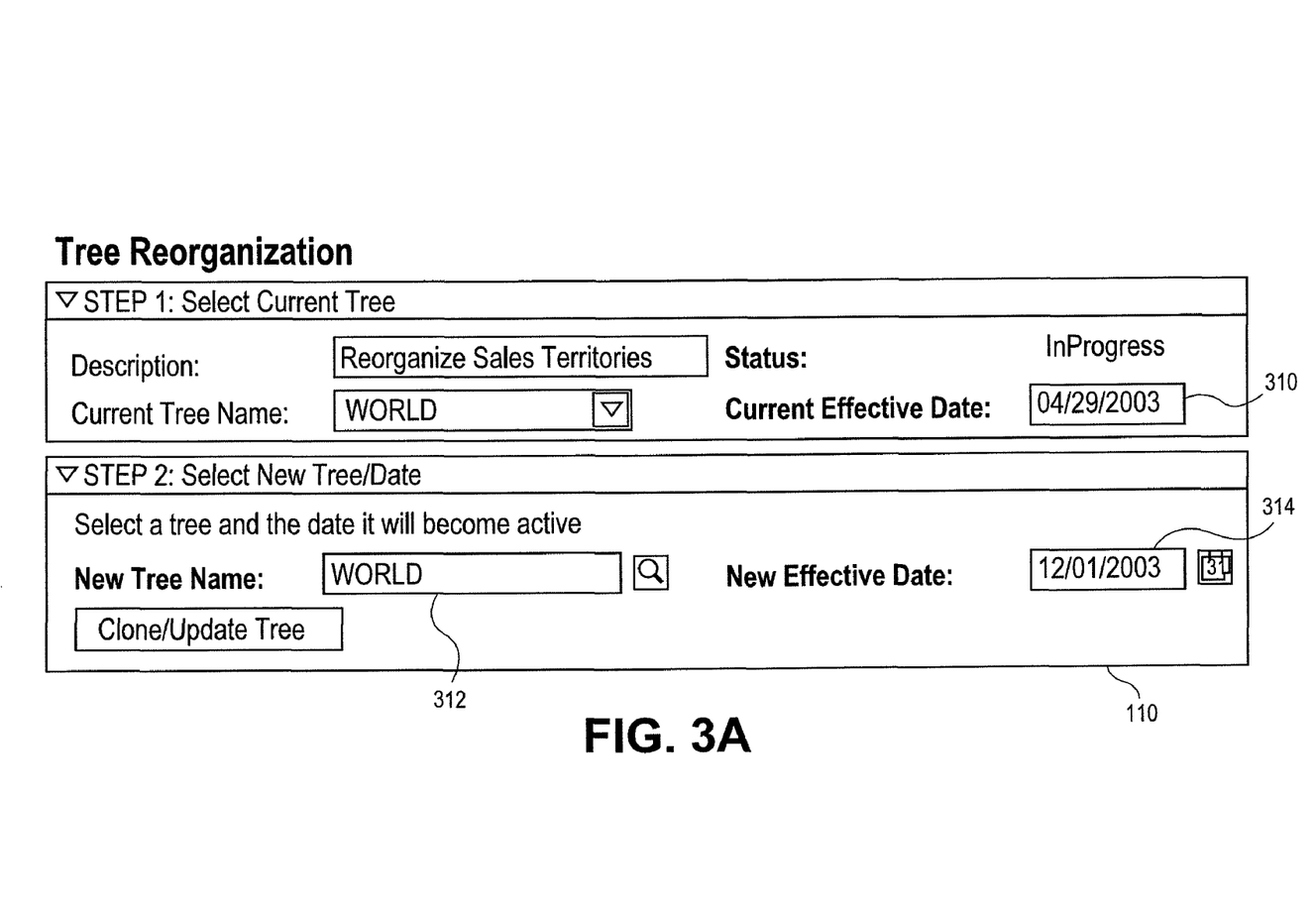
FIGS. 3A-3D are illustrations of an administrative interface and a user interface configured for performing some embodiments of the methods illustrated in FIG. 2.

FIG. 3A illustrates an instance of Administrative Interface 110 configured for selecting a current territory tree to be modified. The current territory tree is named WORLD and is associated with a Current Effective Date 310 of Apr. 29, 2003. A new territory tree name is optionally entered in the New Tree Name Field 312 and, as part of Specify Effective Date Step 230, may be associated with a new effective date using a New Effective Date Field 314. In the example shown in FIG.

3A the new effective date is specified to be Dec. 1, 2003 (a date in the future). The effective date of a set of assignment rules used to define a territory may be considered the effective date of the territory. The instance of Administrative Interface 110 illustrated in FIG. 3A is optionally used in an embodiment of Modify Rule Step 225.

Figure 3B:
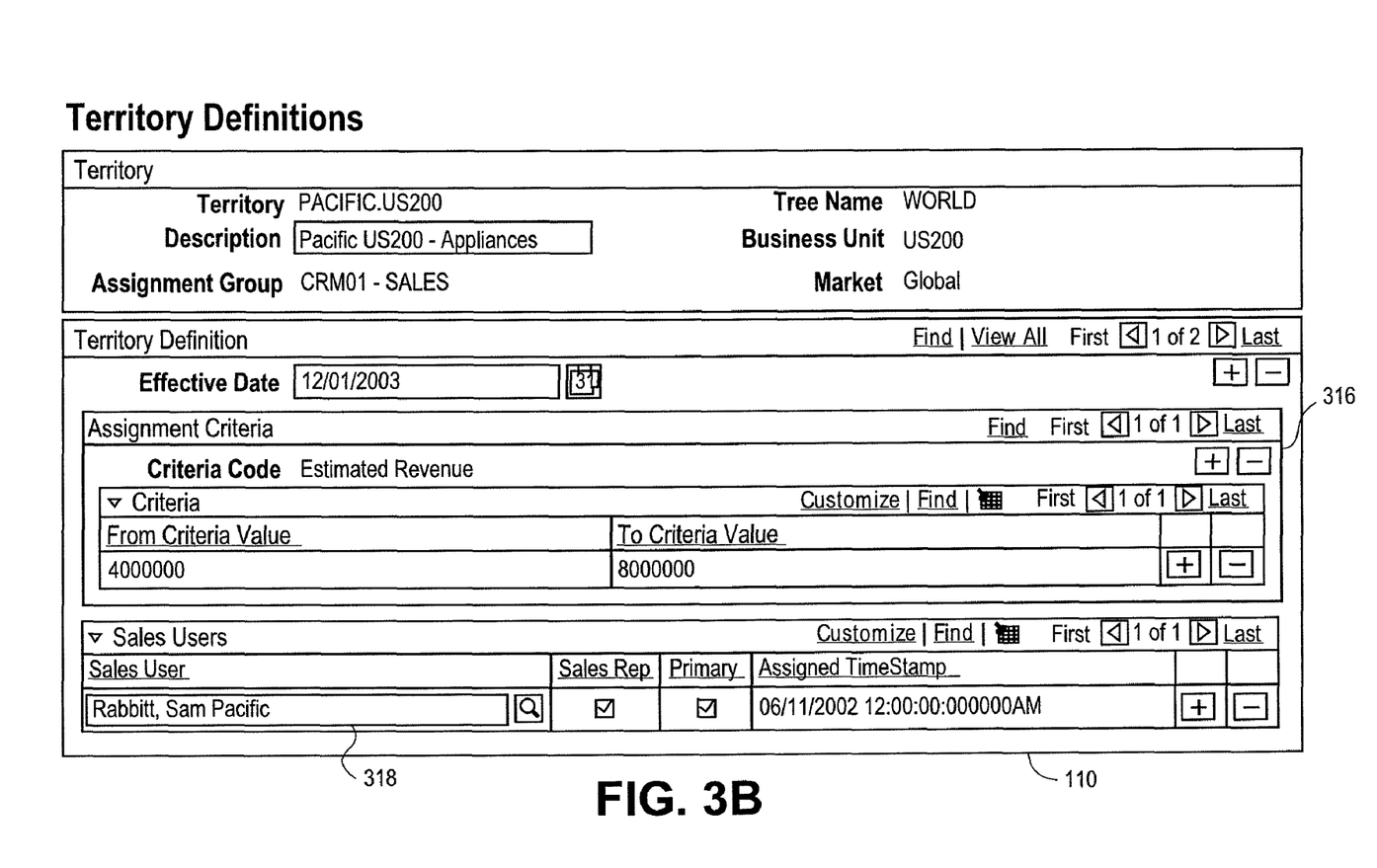

FIG. 3B illustrates an embodiment of Administrative Interface 110 configured for modifying the definition of a sales territory "PACIFIC US200" which is included in the territory tree WORLD. This definition is optionally stored as an assignment rule in Rules Memory 130. The instance of Administrative Interface 110 illustrated includes an Assignment Criteria Field 316 configured for defining criteria based on a range of estimated revenue and a Sales User Field 318 configured for specifying a sales person to be assigned a sales lead meeting the territorial and criteria requirements.

Figure 3C:
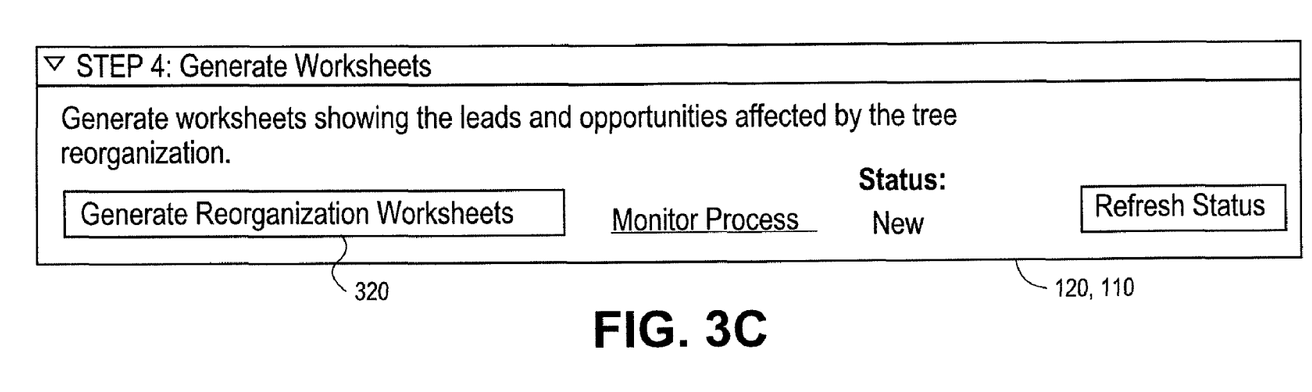

FIG. 3C illustrates an embodiment of Administrative Interface 110 or User Interface 120 that may be used to generate uncommitted assignments, such as in Assign Sales Lead Step 235. This embodiment includes a Generate Reorganization Worksheets Input 320. An administrator or user may use this input to cause Computing Instructions 170 to perform Assign Sales Lead Step 235 using the modified territory definition (assignment rule) generated using the interface of FIG. 3B. In one embodiment Computing Instructions 170 are configured to examine the committed sales lead assignments stored in Committed Assignments Memory 140 and generated uncommitted assignments of these sales leads using the new territory definition. In another embodiment, Computing Instructions 170 are configured to generate new uncommitted assignments of sales leads using the new territory definition as new sales leads are received.

Figure 3D:
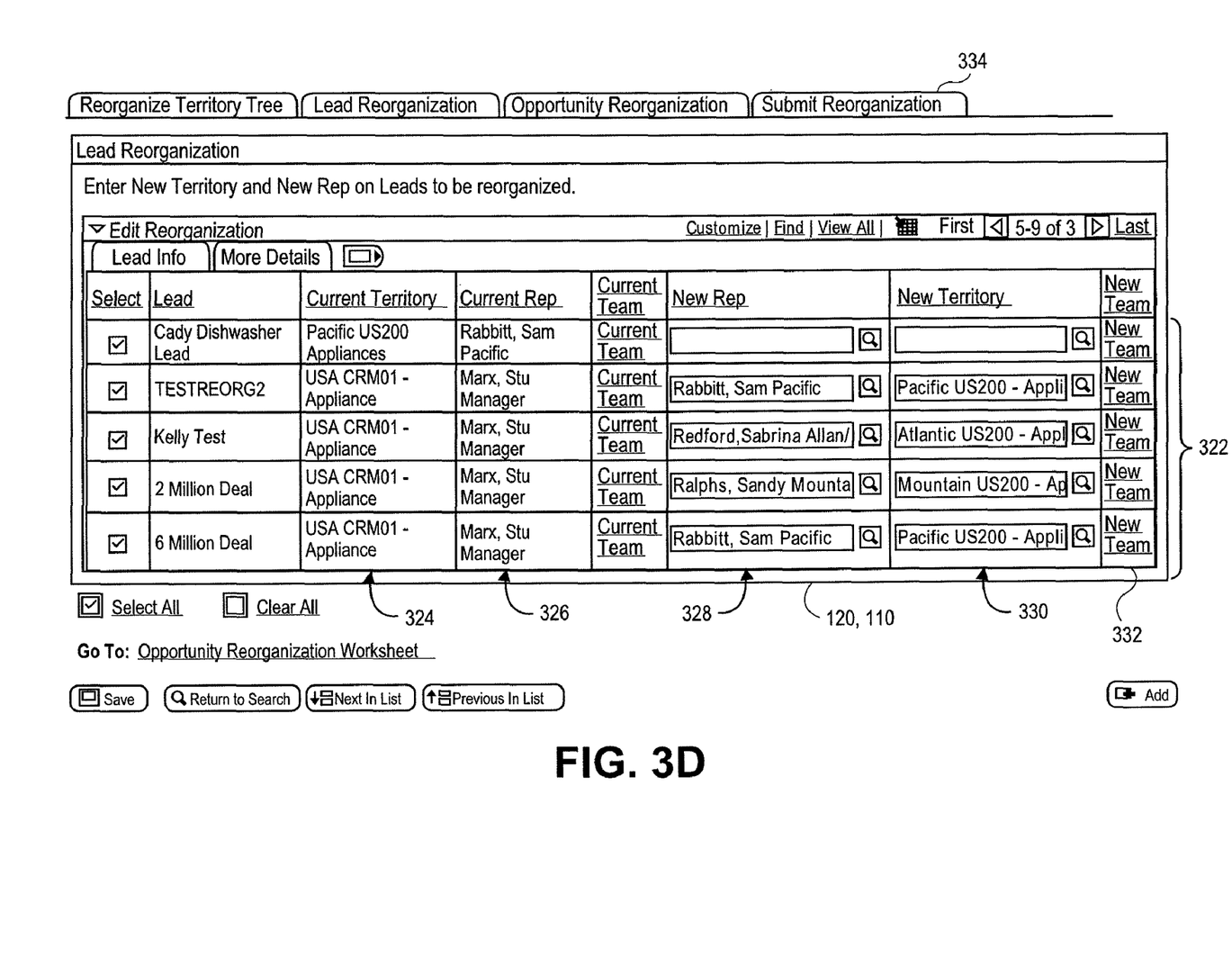

FIG. 3D illustrates an embodiment of Administrative Interface 110 or user Interface 120 that may be used to review the affects of a modification to an assignment rule, such as in View Assignment Step 240. In the illustrated embodiment, five sales leads are shown in five Rows 322. Each Row 322 includes a Current Territory 324 and a Current Rep 326 (salesperson) to which a sales lead has been assigned in a set of committed assignments. Each Row 322 further includes a New Rep 328 and New Territory 330 to which the sales lead is assigned in a set of uncommitted assignments. A New Team Input 332 is optionally used to manually modify an assignment. A user may use a Submit Reorganization Tab 334 to change the effective date of the modified assignment rule such that any further assignments made using the modified assignment rule are committed. Thus, the reorganized territories may be made effective after reviewing their effects using Administrative Interface 110 or user Interface 120.

The interface illustrated in FIG. 3D is configured for reviewing assignments made using modified assignment rules, prior to using the modified assignment rule for making committed assignments. The interface illustrated in FIG. 3D may further be configured for performing load balancing of assignments among assignees, or for notifying assignees of upcoming changes in assignment rules and the affect those changes will have.

Several embodiments are specifically illustrated and/or described herein. However, it will be appreciated that modifications and variations are covered by the above teachings and within the scope of the appended claims without departing from the spirit and intended scope thereof For example, in alternative embodiments the use of an effective date to differentiate those assignment rules that may be used to generate committed or uncommitted assignments may be replaced by the use of a flag. In these embodiments, the status of an assignment would be determined by the state of one or more flags associated with the set of assignment rules used to make the assignment. An administrator may choose to set a flag such that an assignment made with a particular assignment rule will never become committed, or may choose to set a flag such that an assignment made with a particular assignment rule will become committed at the beginning of a financial quarter, etcetera.

Further, in some embodiments the systems and methods described herein are adapted to assign sales leads associated with either products or services, or to assign leads associated with transactions other than sales, such as leases, rentals, purchases, human resource leads, other opportunities, or the like. In some embodiments, the systems and methods of the invention are configured to make assignments of business objects other than leads (e.g., assignment of tasks or resources).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of managing assignment of a sales lead, the method comprising:
selecting a territory tree including a first sales lead;
selecting a new effective date for the first sales lead of the territory tree;
assigning the first sales lead using an assignment rule to make a first assignment to an assignee, the first assignment being committed to the assignee and based on the new effective date of the sales lead;
modifying the assignment rule such that the assignment rule pertains to a different effective date of the sales lead; and
assigning, using at least one processor operatively coupled with a memory, sales leads responsive to the modified assignment rule, the assignments being uncommitted until the new effective date.

2. The method of claim 1, further comprising:
reviewing the assignments before the effective date.

3. The method of claim 2, wherein reviewing the assignments includes comparing the assignments with other assignments made before modifying the territory tree.

4. The method of claim 1, wherein the effective date for the territory tree is selected by associating the effective date with a sales lead assignment rule used for assigning the sales leads.

5. The method of claim 4, wherein the territory tree is modified through an administrator interface configured to review the assigned sales leads responsive to the modified territory tree.

6. The method of claim 5, wherein the administrator interface is further configured to manually modify one of the sales lead assignments.

7. The method of claim 5, wherein the administrator interface is further configured to define a sales territory with an effective date in the future.

8. The method of claim 5, wherein the administrator interface is further configured to manually load balance the sales lead assignments.

9. The method of claim 5, wherein the administrator interface is further configured to define assignment criteria responsive to external data.

10. The method of claim 5, wherein the administrator interface is further configured to reorganize sales territories and to preview the lead assignments based on the reorganized sales territories.

11. A computer readable tangible storage media including computer code indicative of computing instructions for causing one or more processors to perform operations, the computer code comprising:
   selecting a territory tree including a first sales lead;
   selecting a new effective date for the first sales lead of the territory tree;
   assigning the first sales lead using an assignment rule to make a first assignment to an assignee, the first assignment being committed to the assignee and based on the new effective date of the sales lead;
   modifying the assignment rule such that the assignment rule pertains to a different effective date of the sales lead; and
   assigning, using at least one processor operatively coupled with a memory, sales leads responsive to the modified assignment rule, the assignments being uncommitted until the new effective date.

12. A system for managing assignment of a sales lead, the system comprising:
   a storage medium; and
   a processor in communication with the storage medium having sets of instructions stored thereon which, when executed by the processor, causes the processor to:
   select a territory tree including a first sales lead;
   select a new effective date for the first sales lead of the territory tree;
   assign the first sales lead using an assignment rule to make a first assignment to an assignee, the first assignment being committed to the assignee and based on the new effective date of the sales lead;
   modify the assignment rule such that the assignment rule pertains to a different effective date of the sales lead; and
   assign sales leads responsive to the modified assignment rule, the assignments being uncommitted until the new effective date.

* * * * *

UNITED STATES PATENT AND TRADEMARK OFFICE
CERTIFICATE OF CORRECTION

| | | |
|---|---|---|
| PATENT NO. | : 8,255,255 B2 | Page 1 of 1 |
| APPLICATION NO. | : 13/117000 | |
| DATED | : August 28, 2012 | |
| INVENTOR(S) | : Patnaik et al. | |

It is certified that error appears in the above-identified patent and that said Letters Patent is hereby corrected as shown below:

In column 1, line 30, delete "about," and insert -- about --, therefor.

In column 1, line 55, delete "etcetera" and insert -- et cetera. --, therefor.

In column 4, line 16, delete "assignment-rules" and insert -- assignment rules --, therefor.

In column 4, line 17, delete "with," and insert -- with --, therefor.

In column 5, line 17, delete "possible," and insert -- possible --, therefor.

In column 7, line 50, delete "interface" and insert -- Interface --, therefor.

In column 9, line 52, delete "effective," and insert -- effective --, therefor.

In column 10, line 30, delete "more that" and insert -- more than --, therefor.

In column 10, line 64, delete "Anew" and insert -- A new --, therefor.

In column 11, line 38-50, delete "Rows 322. Each Row.......................user Interface 120." and insert the same on Col. 11, Line 37, after "shown in five" as continuation of the same paragraph.

In column 11, line 63, delete "thereof" and insert -- thereof. --, therefor.

In column 12, line 22, delete "and or" and insert -- and/or --, therefor.

In column 12, line 58, in Claim 5, delete "claim 4," and insert -- claim 1, --, therefor.

Signed and Sealed this
Twelfth Day of February, 2013

Teresa Stanek Rea
*Acting Director of the United States Patent and Trademark Office*